United States Patent
O'Coin

(10) Patent No.: US 11,603,879 B2
(45) Date of Patent: Mar. 14, 2023

(54) CAPTIVE FASTENER SYSTEMS

(71) Applicant: Hamilton Sundstrand Corporation, Charlotte, NC (US)

(72) Inventor: James R. O'Coin, Somers, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 308 days.

(21) Appl. No.: 16/881,504

(22) Filed: May 22, 2020

(65) Prior Publication Data

US 2021/0364033 A1  Nov. 25, 2021

(51) Int. Cl.
*F16B 41/00* (2006.01)
*F16B 5/02* (2006.01)

(52) U.S. Cl.
CPC .......... *F16B 41/002* (2013.01); *F16B 5/0208* (2013.01)

(58) Field of Classification Search
CPC .............................. F16B 41/002; F16B 5/0208
USPC ......................................................... 411/999
See application file for complete search history.

(56) References Cited

U.S. PATENT DOCUMENTS

| | | | |
|---|---|---|---|
| 3,346,032 A | 10/1967 | Gulistan | |
| 4,191,236 A | 3/1980 | Duran | |
| 4,324,517 A * | 4/1982 | Dey | F16B 5/0208 411/105 |
| 4,464,091 A | 8/1984 | Molina | |
| 4,621,961 A | 11/1986 | Gulistan | |
| 5,326,206 A | 7/1994 | Moore | |
| 5,882,015 A | 3/1999 | McPherson | |
| 6,158,717 A | 12/2000 | Van Scyoc et al. | |
| 6,761,521 B2 * | 7/2004 | McCormack | F16B 5/0208 411/107 |
| 8,696,277 B2 | 4/2014 | Wagner | |
| 8,932,022 B2 | 1/2015 | Ivakitch et al. | |
| 9,328,753 B2 * | 5/2016 | Bachman | F16B 5/0208 |
| 10,054,142 B2 * | 8/2018 | Bachman | F16B 5/0208 |
| 10,208,779 B2 | 2/2019 | Schneider et al. | |
| 11,396,901 B2 * | 7/2022 | Tulloch | F16B 41/002 |
| 2002/0172574 A1 * | 11/2002 | McCormack | F16B 5/0208 411/352 |
| 2008/0145180 A1 | 6/2008 | Hermann et al. | |

(Continued)

FOREIGN PATENT DOCUMENTS

EP  2336580 A1  6/2011

OTHER PUBLICATIONS

European Search Report for European Application No. 21163921.6, dated Sep. 21, 2021, 5 pages.

*Primary Examiner* — David P Bryant
*Assistant Examiner* — Darrell C Ford
(74) *Attorney, Agent, or Firm* — Cantor Colburn LLP

(57) ABSTRACT

Captive fastener systems and structural assemblies having captive fastener systems are described. The captive fastener systems include a captive fastener assembly having a sleeve and a captive fastener arranged within the sleeve, a mounting assembly having a bushing and a mounting fastener arranged to pass through the bushing, and a joining body having a mounting aperture, wherein the sleeve is attached to the joining body and the bushing and the mounting fastener are configured to pass through the mounting aperture. The mounting assembly is configured to provide a first degree of movement of the captive fastener system and the captive fastener assembly is configured to provide a second degree of movement of the captive fastener system.

12 Claims, 12 Drawing Sheets

(56) References Cited

U.S. PATENT DOCUMENTS

| | | |
|---|---|---|
| 2011/0188962 A1 | 8/2011 | Joyce |
| 2011/0302759 A1 | 12/2011 | Chiu |
| 2012/0251265 A1 | 10/2012 | Chiu |
| 2014/0096363 A1 | 4/2014 | Khamithar et al. |
| 2015/0192168 A1* | 7/2015 | Chen .................... F16B 41/002 411/511 |
| 2015/0267730 A1* | 9/2015 | He ........................ F16B 35/048 411/352 |
| 2018/0100532 A1* | 4/2018 | Mugan .................. F16B 5/0208 |
| 2018/0172059 A1* | 6/2018 | Hutchings ............. F16B 41/002 |
| 2019/0393644 A1* | 12/2019 | Hayashi ............. H01R 13/6215 |
| 2021/0254645 A1* | 8/2021 | Corey .................. F16B 5/0208 |

* cited by examiner

CAPTIVE FASTENER SYSTEMS

STATEMENT REGARDING FEDERALLY SPONSORED RESEARCH OR DEVELOPMENT

This invention was made with government support under NNJ10TB01C awarded by NASA. The government has certain rights in the invention.

BACKGROUND

The subject matter disclosed herein generally relates to fastener systems, and more specifically to captive fastener systems having increased float capabilities.

When installing or connecting two components or structures, fasteners may be used to ensure proper engagement therebetween. One type of fastener for such connections is a captive fastener. Captive fasteners/captive fastener assemblies are a class of fastener designed for a permanent hold (captivation) within a target assembly or housing, including upon servicing. By employing a captive fastener assembly, such systems can provide a secure joining, and avoid fastener loss or damage that might be caused by a loose part. That is, when two structures, which are joined by a captive fastener, are separated, the fastener that is captive remains with one of the two structures or otherwise secured such that the fastener is not loose. Examples of captive fasteners include threaded locking systems, press-fitting systems, or broaching systems to accomplish an anchor-hold within a larger assembly housing.

BRIEF SUMMARY

According to some embodiments, captive fastener systems are provided. The captive fastener systems include a captive fastener assembly having a sleeve and a captive fastener arranged within the sleeve, a mounting assembly having a bushing and a mounting fastener arranged to pass through the bushing, and a joining body having a mounting aperture, wherein the sleeve is attached to the joining body and the bushing and the mounting fastener are configured to pass through the mounting aperture. The mounting assembly provides a first degree of movement of the captive fastener system and the captive fastener assembly provides a second degree of movement of the captive fastener system.

In addition to one or more of the features described above, or as an alternative, further embodiments of the captive fastener systems may include that the sleeve includes an internal thread configured to enable the fastener to be secured within the sleeve by the internal thread.

In addition to one or more of the features described above, or as an alternative, further embodiments of the captive fastener systems may include that the captive fastener comprises a shank having a diameter that is less than an internal surface of the internal thread to provide a float between the shank and the internal thread.

In addition to one or more of the features described above, or as an alternative, further embodiments of the captive fastener systems may include that the captive fastener assembly includes a biasing element configured to provide a biasing force to the captive fastener.

In addition to one or more of the features described above, or as an alternative, further embodiments of the captive fastener systems may include that the sleeve and the joining body are formed of a continuous material.

In addition to one or more of the features described above, or as an alternative, further embodiments of the captive fastener systems may include that the sleeve is fixedly attached to the joining body.

In addition to one or more of the features described above, or as an alternative, further embodiments of the captive fastener systems may include that the mounting fastener is configured to threadedly connect to a first structure and the captive fastener is configured to threadedly connect to a second structure to fixedly attach the first structure to the second structure.

In addition to one or more of the features described above, or as an alternative, further embodiments of the captive fastener systems may include at least one additional captive fastener assembly having a respective sleeve and a respective captive fastener, wherein the sleeve of the at least one additional captive fastener assembly is attached to the joining body.

In addition to one or more of the features described above, or as an alternative, further embodiments of the captive fastener systems may include at least one additional mounting assembly having a respective bushing and a respective mounting fastener, wherein the at least one additional mounting assembly is configured to pass through an additional mounting aperture of the joining body.

In addition to one or more of the features described above, or as an alternative, further embodiments of the captive fastener systems may include that the captive fastener has a first end and a second end with a head arranged at the first end and a threaded portion at the second end.

According to some embodiments, structural assemblies are provided. The structural assemblies include a first structure, a second structure, wherein the first structure is configured to be mounted to the second structure, and a captive fastener system configured to mount and connect the first structure to the second structure. The captive fastener system includes a captive fastener assembly having a sleeve and a captive fastener arranged within the sleeve, wherein the captive fastener is configured to threadedly engage with the second structure, a mounting assembly having a bushing and a mounting fastener arranged to pass through the bushing, wherein the mounting fastener is configured to threadedly engage with the first structure, and a joining body having a mounting aperture, wherein the sleeve is attached to the joining body and the bushing and the mounting fastener are configured to pass through the mounting aperture. The mounting assembly provides a first degree of movement of the captive fastener system and the captive fastener assembly provides a second degree of movement of the captive fastener system.

In addition to one or more of the features described above, or as an alternative, further embodiments of the structural assemblies may include that the sleeve includes an internal thread configured to enable the fastener to be secured within the sleeve by the internal thread.

In addition to one or more of the features described above, or as an alternative, further embodiments of the structural assemblies may include that the captive fastener comprises a shank having a diameter that is less than an internal surface of the internal thread to provide a float between the shank and the internal thread.

In addition to one or more of the features described above, or as an alternative, further embodiments of the structural assemblies may include that the captive fastener assembly includes a biasing element configured to provide a biasing force to the captive fastener.

In addition to one or more of the features described above, or as an alternative, further embodiments of the structural assemblies may include that the sleeve and the joining body are formed of a continuous material.

In addition to one or more of the features described above, or as an alternative, further embodiments of the structural assemblies may include that the sleeve is fixedly attached to the joining body.

In addition to one or more of the features described above, or as an alternative, further embodiments of the structural assemblies may include that the joining body defines an engagement surface that contacts and engages with the first structure.

In addition to one or more of the features described above, or as an alternative, further embodiments of the structural assemblies may include at least one additional captive fastener assembly having a respective sleeve and a respective captive fastener, wherein the sleeve of the at least one additional captive fastener assembly is attached to the joining body.

In addition to one or more of the features described above, or as an alternative, further embodiments of the structural assemblies may include at least one additional mounting assembly having a respective bushing and a respective mounting fastener, wherein the at least one additional mounting assembly is configured to pass through an additional mounting aperture of the joining body.

In addition to one or more of the features described above, or as an alternative, further embodiments of the structural assemblies may include that the captive fastener has a first end and a second end with a head arranged at the first end and a threaded portion at the second end.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
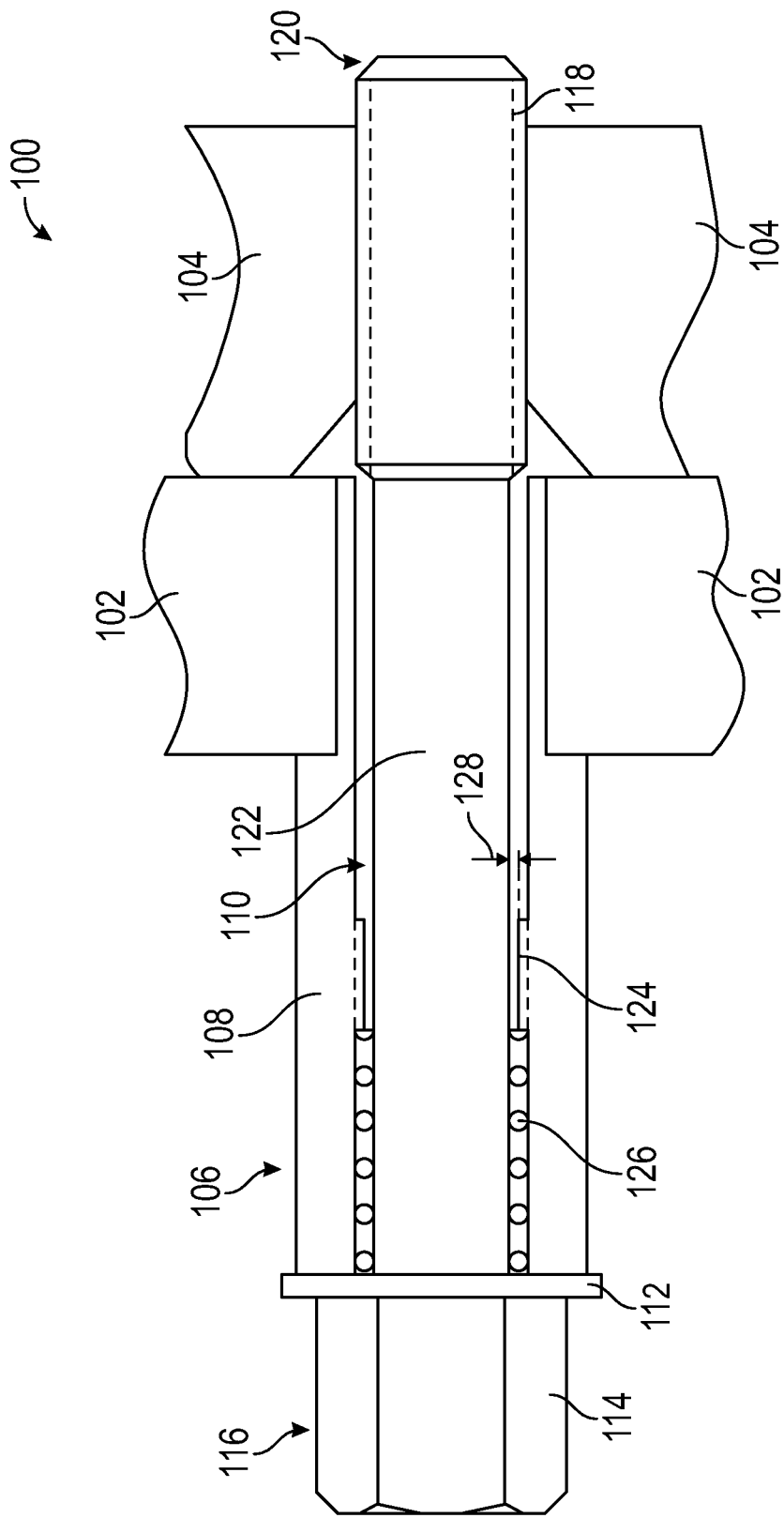
FIG. 1 is a schematic illustration of a captive fastener.

Referring to FIG. 1, a captive fastener assembly 100 is illustratively shown. The captive fastener assembly 100 is a system for joining and connecting a first structure 102 to a second structure 104 using a captive fastener 106. The captive fastener 106 is configured to securely and fixedly (but removably) attach the first structure 102 to the second structure 104. In this illustrative configuration, the captive fastener 106 is fixedly (and not removably) attached and connected to (e.g., part of) the first structure 102. Thus, when the first structure 102 is separated from the second structure 104, the captive fastener 106 remains attached to the first structure 102. This is particularly useful when loose parts are a challenge or can be of concern (e.g., in low gravity environments).

The captive fastener 106 includes a sleeve 108 that is configured to be fixedly and (optionally) permanently attached to the first structure 102, such as by bonding, welding, threaded connection, lock-and-key, etc., as will be appreciated by those of skill in the art. The sleeve 108 defines an internal bore or channel 110 through which a fastener 112 passes. The fastener 112 is movably retained within the channel 110 and is configured to not be easily separated from the sleeve 108. The fastener 112 includes a head 114 at a first end 116, a threaded portion 118 at a second end 120, and a body or shank 122 extending between and connecting the head 114 to the threaded portion 118.

To retain the fastener 112 within the channel 110, the sleeve 108 includes an internal thread 124. The internal thread 124 extends radially inward from an internal surface of the channel 110 of the sleeve 108 a distance that is equal to an external radial outward extent of threads of the threaded portion 118 of the fastener 112. As such, translational movement of the fastener 112 to exit the sleeve 108 is prevented. That is, the internal threads 124 are configured to operate as a stop to secure and retain the fastener 112 within the sleeve 108. It is noted that the internal thread 124 is a threaded structure that allows for the threaded portion 118 of the fastener 112 to be unthreaded and enables the fastener 112 to be completely removed from the sleeve 108. An optional biasing element 126 (e.g., a spring) may be provided between the internal thread 124 and the head 114 of the fastener 112.

When the fastener 112 is installed into the sleeve 108, but not yet engaged with the second structure 104, the fastener 112 has radial float 128. The radial float 128 is the space between an external surface of the shank 122 and the internal surface of the internal thread 124. The shank 122 has a reduced diameter as compared to the threaded portion 118 and the internal surface of the sleeve 108. This reduced diameter shank 122 allows for the fastener 112 to be adjusted in position when the first structure 102 is arranged proximate the second structure 104 and allows for slight adjustment or positioning of the fastener 112 to be threadedly engaged with a threaded hole of the second structure 104. The radial float 128 allows for positional compensation during installation and connection of the first structure 102 to the second structure 104.

Figure 2:
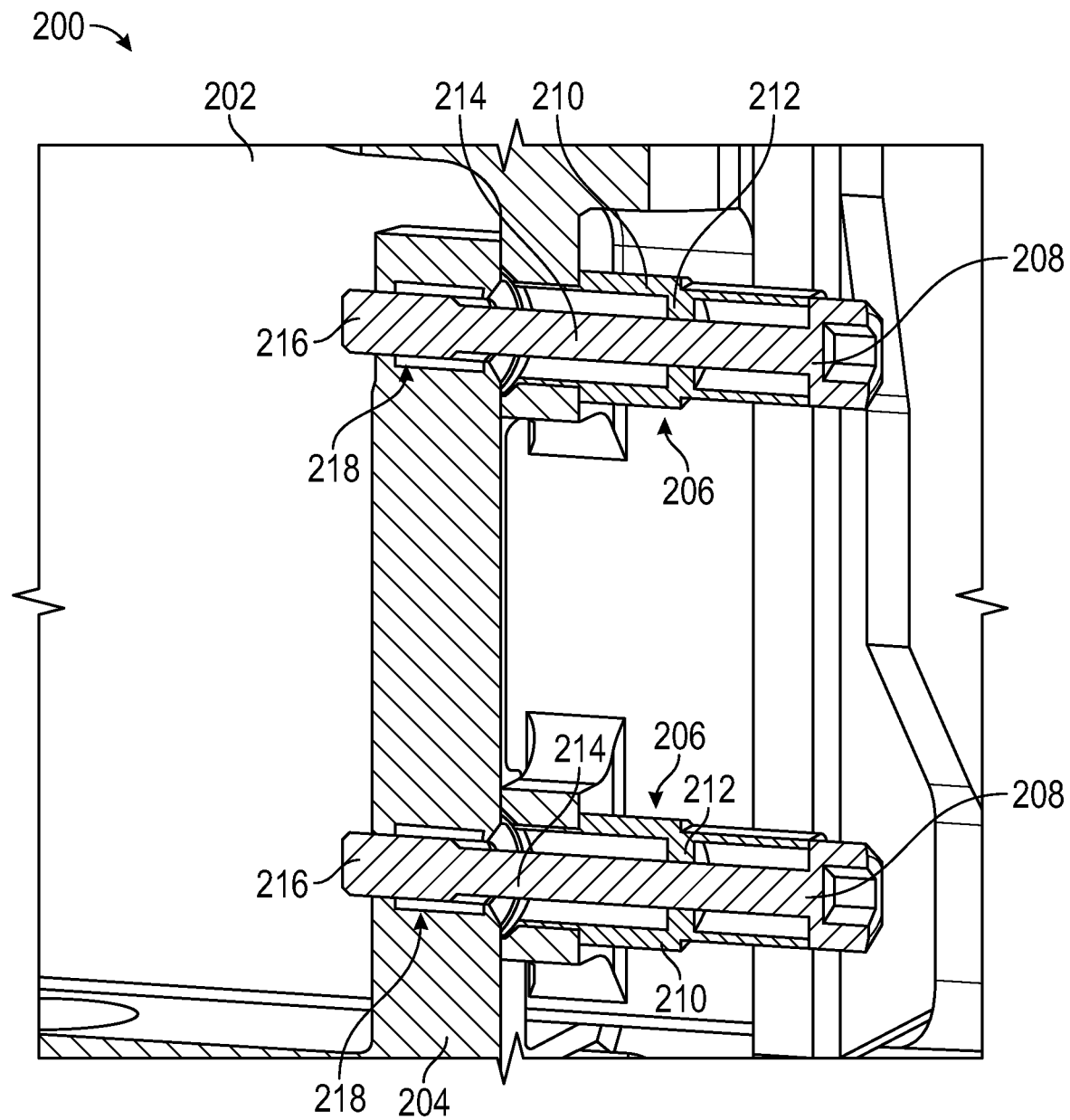
FIG. 2 is a schematic illustration of an assembly of joined structures using captive fasteners.

Turning now to FIG. 2, a schematic illustration of a structural assembly 200 that has a first structure 202 connected to a second structure 204 by captive fasteners 206 is shown. Each captive fastener 206 is fixedly attached to a portion of the first structure 202, such as by welding, swaging, bonding, etc. The captive fasteners 206 include a fastener 208 installed through a sleeve 210 and locked or secured within the sleeve 210 by an internal thread 212 of the sleeve 210. The captive fasteners 206 have reduced diameter shanks 214 and threaded portions 216 configured to threadedly engage with a threaded hole 218 of the second structure 204. As shown, in this configuration, the first structure 202 includes two captive fasteners 206 which are fixed in position and configured to threadedly engage at two locations on the second structure 204.

Because the sleeves 210 of each captive fastener 206 is fixedly connected to the first structure 202 and the threaded holes 218 for installation of the second structure 204 are fixed, the tolerances permitted by such assemblies is very low. The radial float provided by the captive fasteners 206 allows for some variations for alignment of the first structure 202 relative to the second structure 204. If the first structure 202 and the second structure 204 are manufactured separately, there must be very accurate manufacturing to enable the respective components (e.g., captive fasteners 206 and threaded holes 218) to align and allow for the captive fasteners 206 to securely attach the first structure 202 to the second structure 204. If an offset of the features of the first structure 202 and the second structure 204 exists that is greater than acceptable tolerances (e.g., the radial float dimensions), then it may not be possible to connect the first structure 202 to the second structure 204. In view of this, it may be advantageous to improve captive fastener systems and assemblies to allow for greater tolerances, while maintaining structural requirements for joining two structures.

In accordance with embodiments, of the present disclosure, captive fastener assemblies are provided that allow for increased tolerances between first and second structures while maintaining the captive nature of the fasteners and enabling secure joining and attachment of the first structure to the second structure.

Figure 3A:
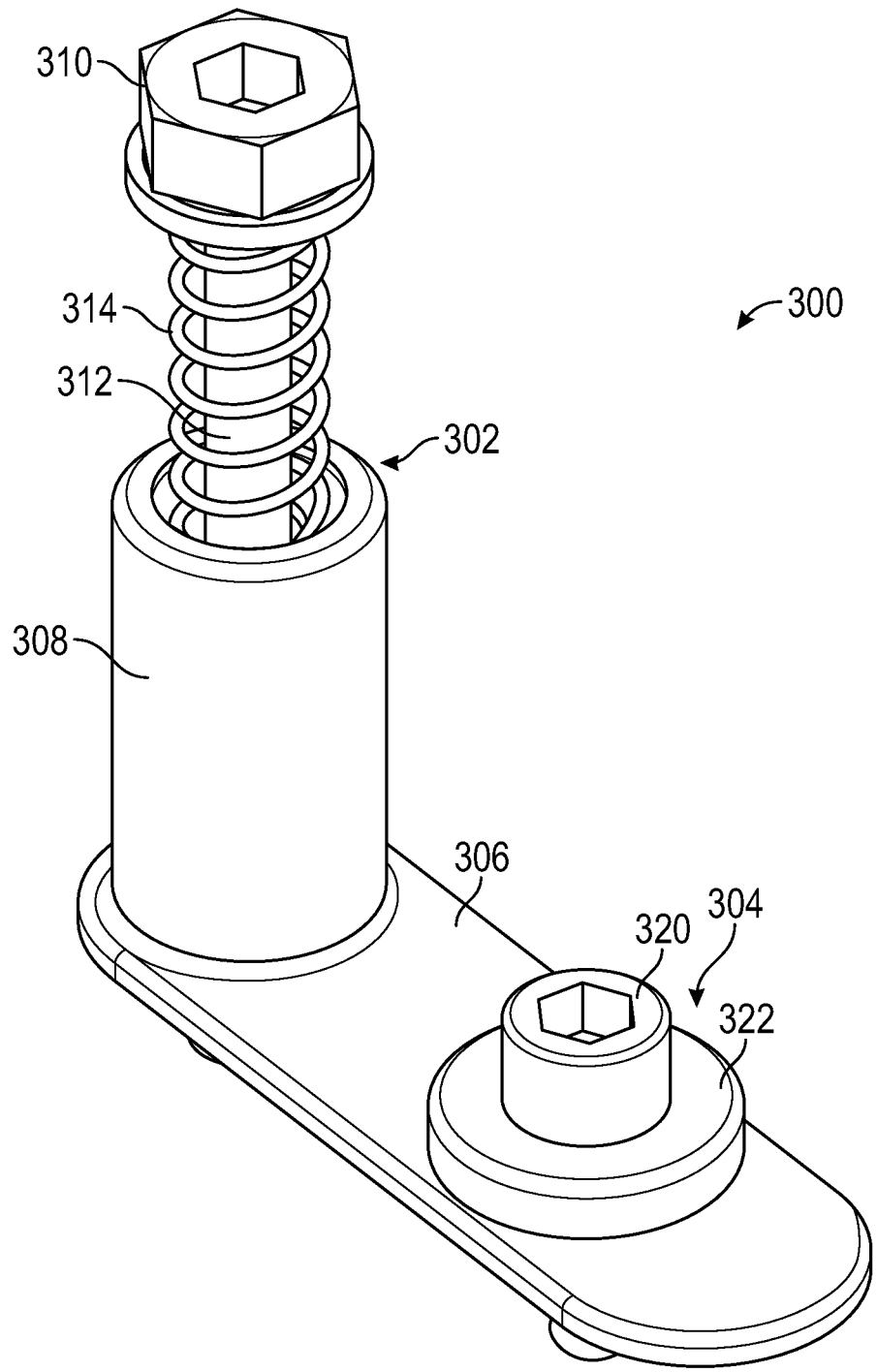
FIG. 3A is a schematic illustration of a captive fastener system in accordance with an embodiment of the present disclosure.
Figure 3B:
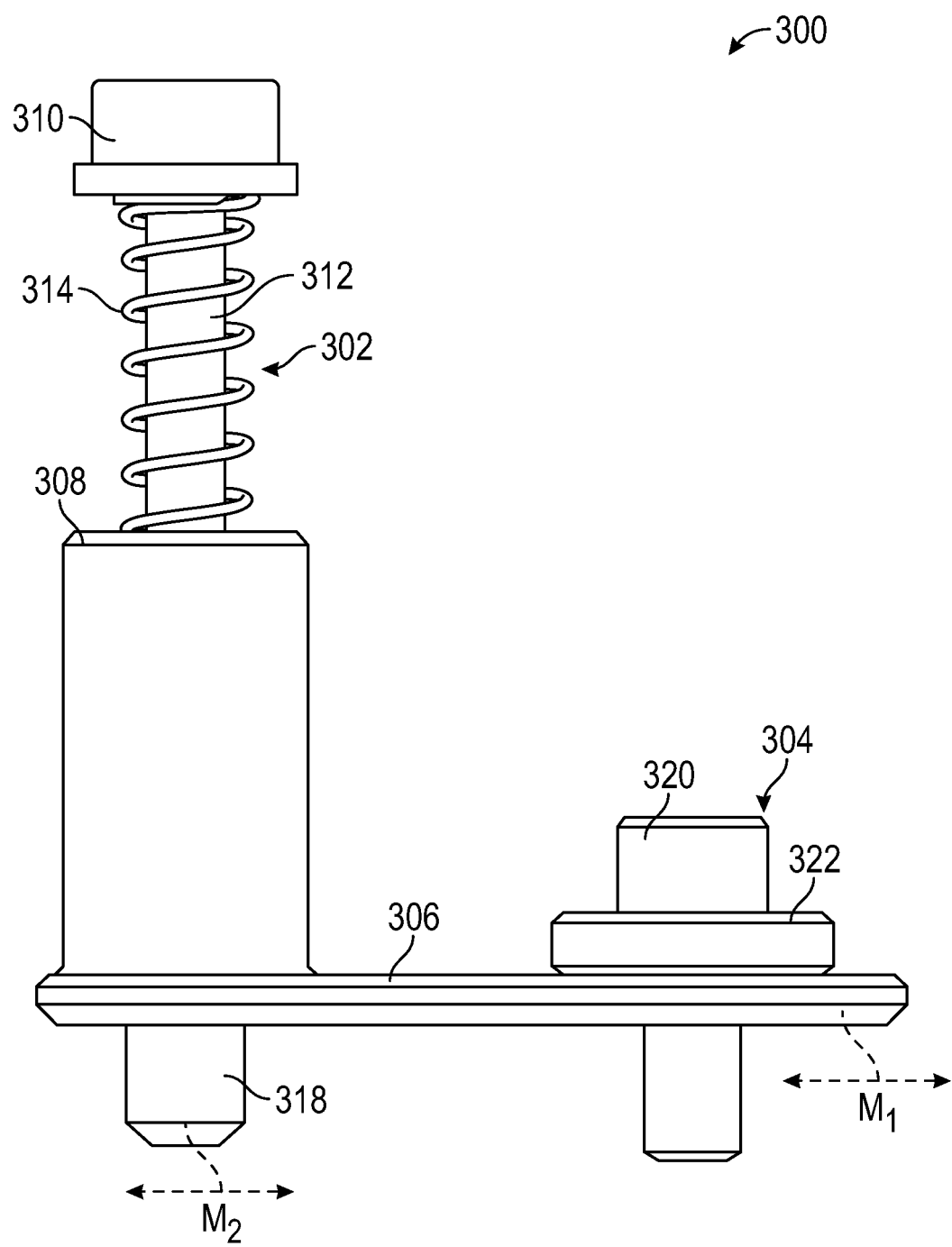
FIG. 3B is a side elevation view of the captive fastener system of FIG. 3A.
Figure 3C:
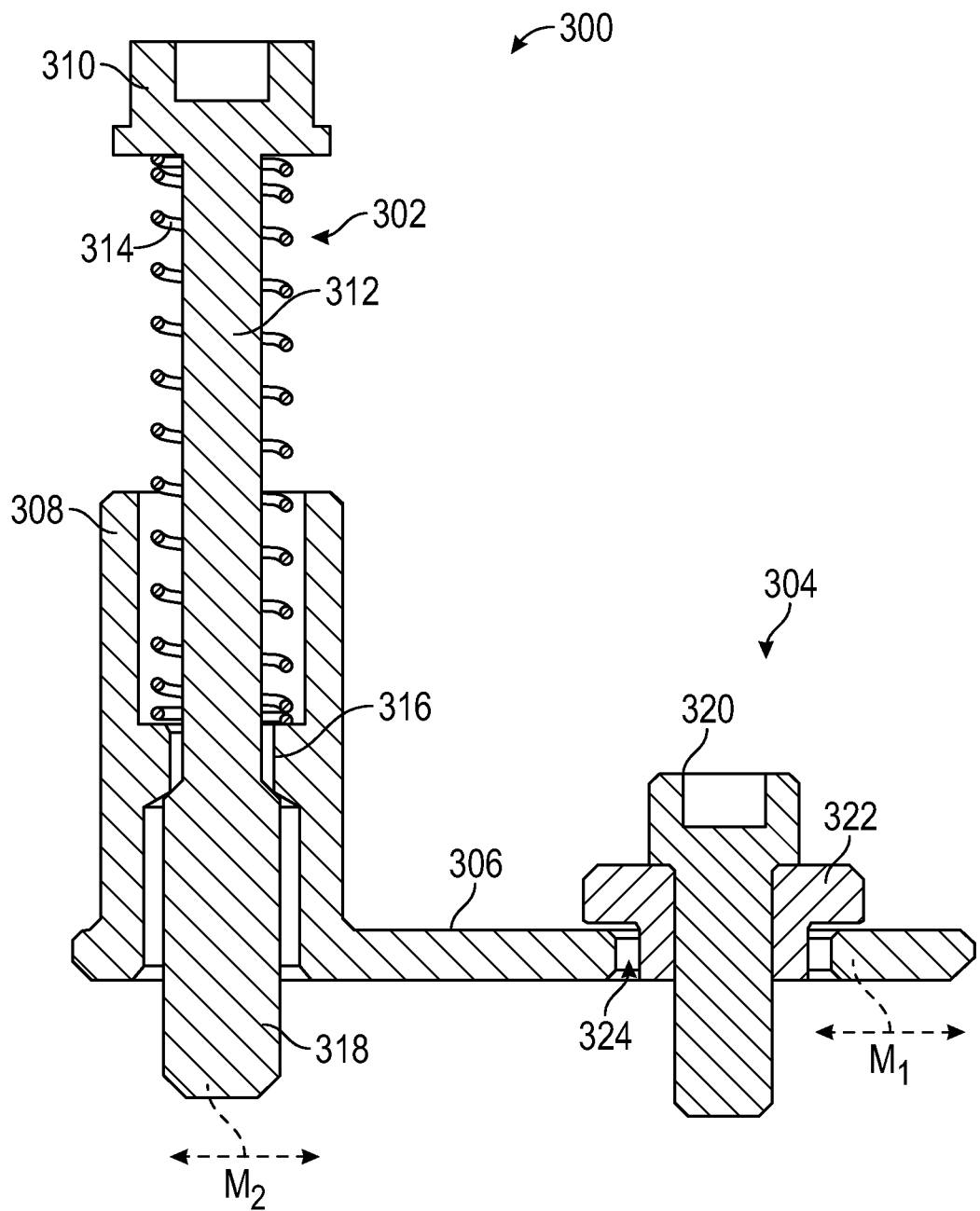
FIG. 3C is a cross-sectional, side elevation view of the captive fastener system of FIG. 3A.

Turning now to FIGS. 3A-3C, schematic illustrations of a captive fastener system 300 in accordance with an embodiment of the present disclosure are shown. FIG. 3A is an isometric illustration of the captive fastener system 300, FIG. 3B is a side elevation view of the captive fastener system 300, and FIG. 3C is a cross-section, side elevation view of the captive fastener system 300. The captive fastener system 300 may be used to join two structures, similar to that described above, but allows for increased adjustment/tolerance with respect to aligning the two structures to be joined.

The captive fastener system 300 is separated from and not part of or fixedly/permanently attached to one of the structures to be joined, but rather provides for an independent captive structure and system that enables a captive fastener without being captive to a specific assembly structure. Instead, the captive fastener system 300 is a separate component that is configured to attach, separately, to each of the first structure and the second structure, using different fasteners, as described herein. The captive fastener system 300 includes a captive fastener assembly 302, a mounting assembly 304, and a joining body 306. The captive fastener assembly 302 is fixedly connected to the joining body 306, whereas the mounting assembly 304 is not fixedly connected to the joining body 306.

The captive fastener assembly 302 includes a sleeve 308, a captive fastener 310 having a shank 312, and a biasing element 314 configured to apply a biasing force to the captive fastener 310, as shown in FIGS. 3A-3C. The sleeve 308 includes an internal thread 316 within the sleeve 308 (shown in FIG. 3C) and the captive fastener 310 includes a threaded portion 318. The threaded portion 318 is configured to threadedly pass through the internal thread 316 of the sleeve 308 to secure the captive fastener 310 within the sleeve 308. In some embodiments, the sleeve 308 is an integral portion of the joining body 306 such that the sleeve 308 and the joining body are a single, continuous structure formed of a single or continuous material (e.g., as shown in FIG. 3B). In other embodiments, the sleeve 308 may be fixedly and permanently attached to the joining body 306 by various known means, such as welding, bodying, swaging, etc.

The mounting assembly 304 includes a mounting fastener 320 and a bushing 322. The bushing 322 is arranged to movably sit within a mounting aperture 324 of the joining body 306. The mounting fastener 320 is configured to threadedly engage with a first structure and, when fully tightened, to secure the bushing 322 and the joining body 306 relative to the first structure. However, after fully tightening the mounting fastener 320, the joining body 306 has play or movement within the mounting aperture 324 between the joining body 306 and the bushing 322, which adds additional freedom of adjustment of the captive fastener system 300. This allows for alignment of the captive fastener 310 of the captive fastener system 300 with an installation hole of a second structure beyond what is permitted by the reduced diameter of the shank 312 within the sleeve 308 and relative to the internal thread 316. That is, the arrangement of the mounting fastener 320 and the joining body 306 being moveable relative thereto provides for a first degree of movement $M_1$ of the captive fastener 310. The reduced diameter shank 312 within the sleeve 308 provides for a second degree of movement $M_2$ of the captive fastener 310.

Figure 4A:
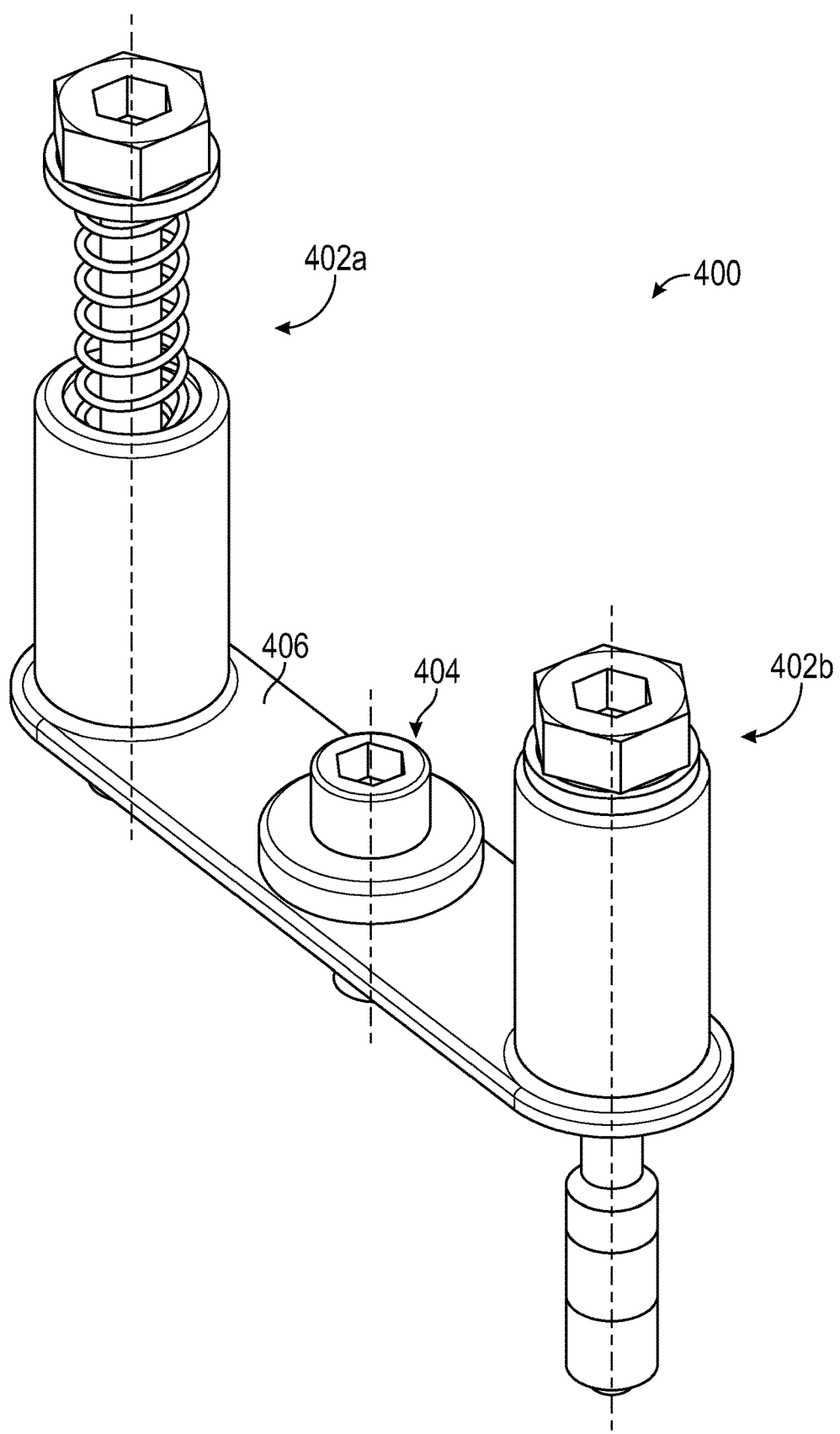
FIG. 4A is a schematic illustration of a captive fastener system in accordance with an embodiment of the present disclosure.
Figure 4B:
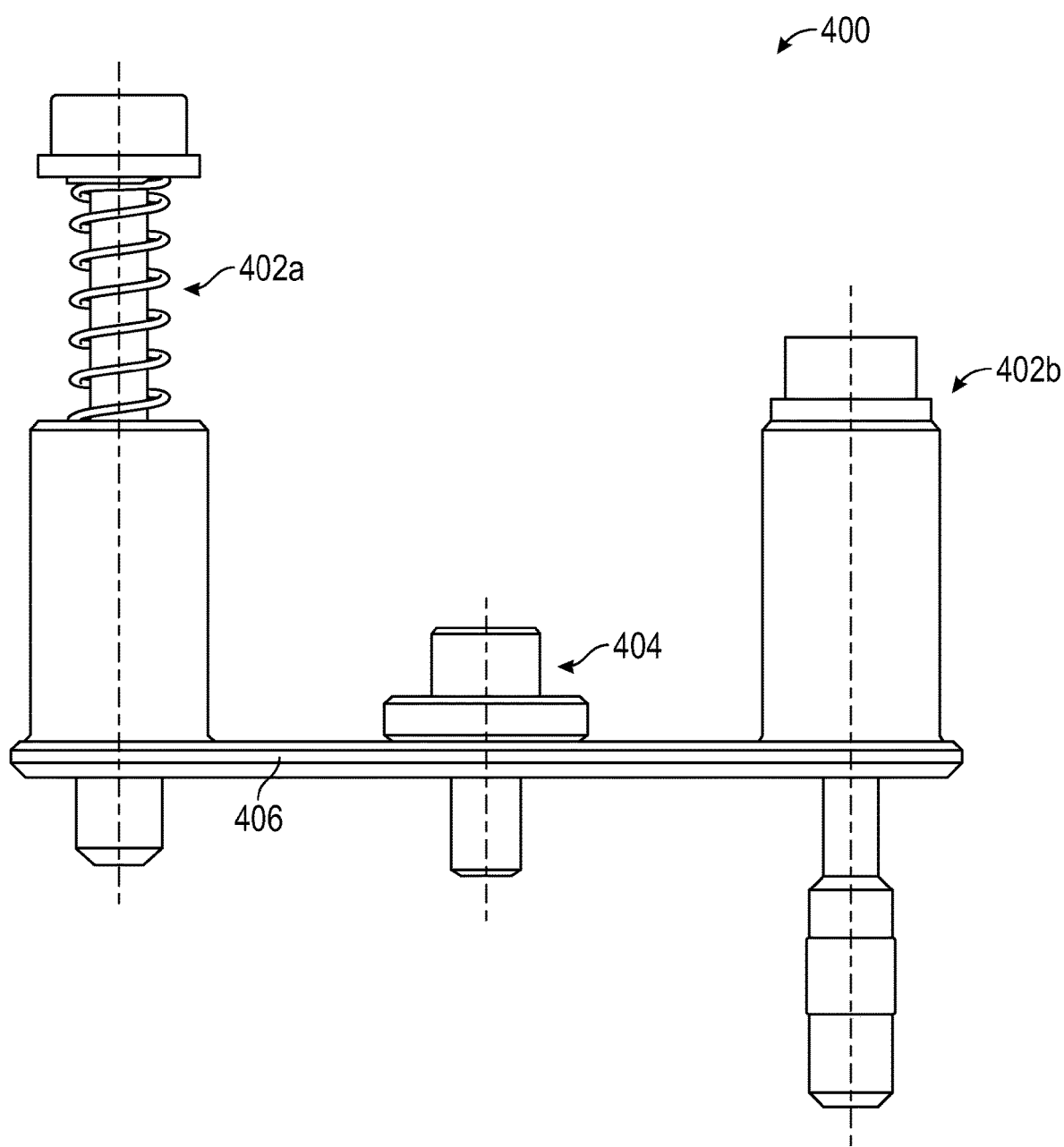
FIG. 4B is a side elevation view of the captive fastener system of FIG. 4A.
Figure 4C:
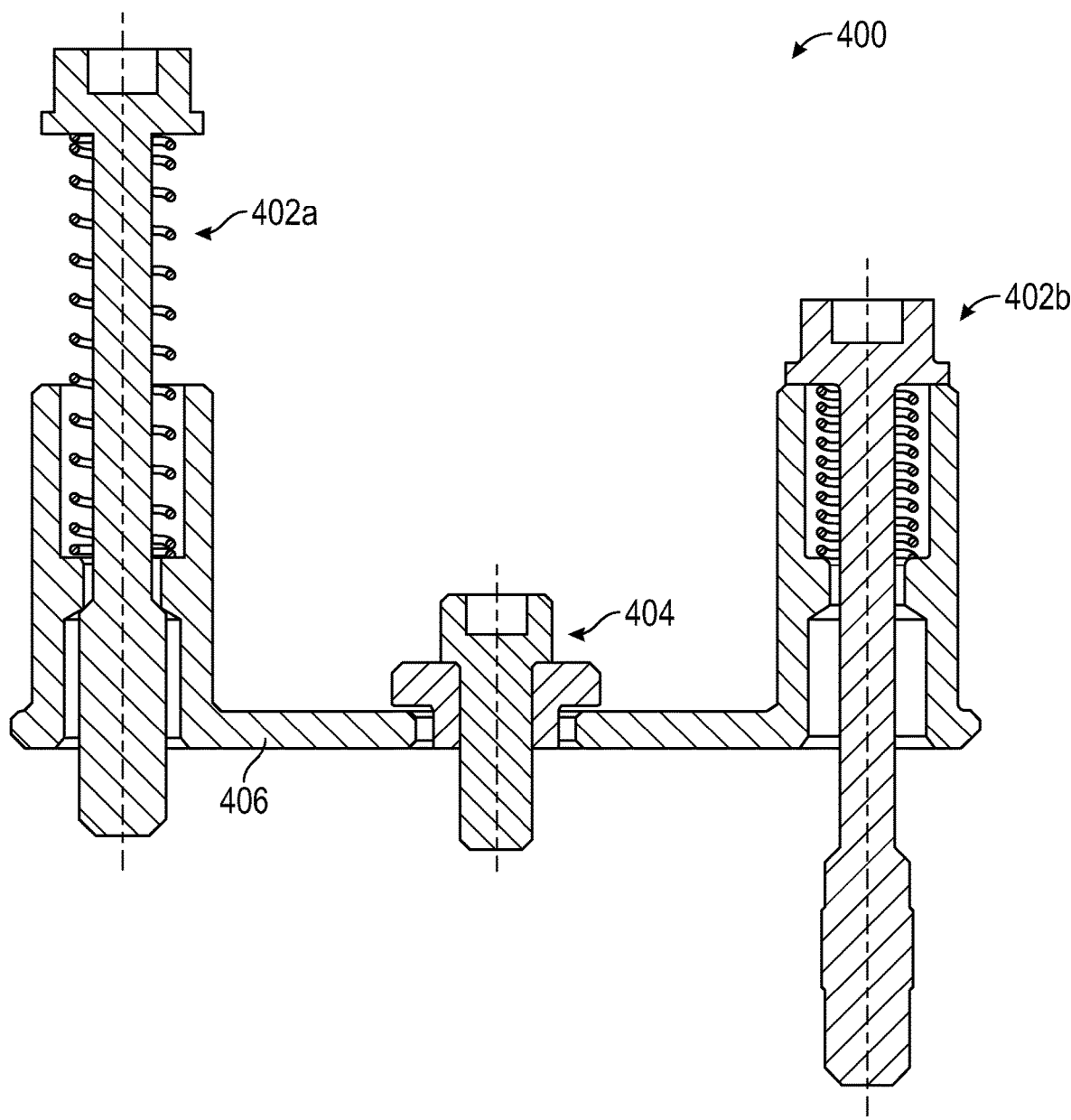
FIG. 4C is a cross-sectional, side elevation view of the captive fastener system of FIG. 4A.

Turning now to FIGS. 4A-4C, schematic illustrations of a captive fastener system 400 in accordance with an embodiment of the present disclosure are shown. FIG. 4a is an isometric illustration of the captive fastener system 400, FIG. 4B is a side elevation view of the captive fastener system 400, and FIG. 4C is a cross-section, side elevation view of the captive fastener system 400. The captive fastener system 400 may be used to join two structures, similar to that described above, but allows for increased adjustment/tolerance with respect to aligning the two structures to be joined. The captive fastener system 400 may be similar to that of the captive fastener system 300 of FIGS. 3A-3C, but includes two captive fastener assemblies 402a, 402b that are joined to a mounting assembly 404 by a joining body 406.

The configuration of FIGS. 4A-4C is illustrative of an alternative configuration that illustrates that the number of captive fastener assemblies can be selected to a specific application and installation and is not limited to a single captive fastener assembly. Further, it will be appreciate that the number of mounting assemblies may be increased beyond a single mounting assembly.

Figure 5:
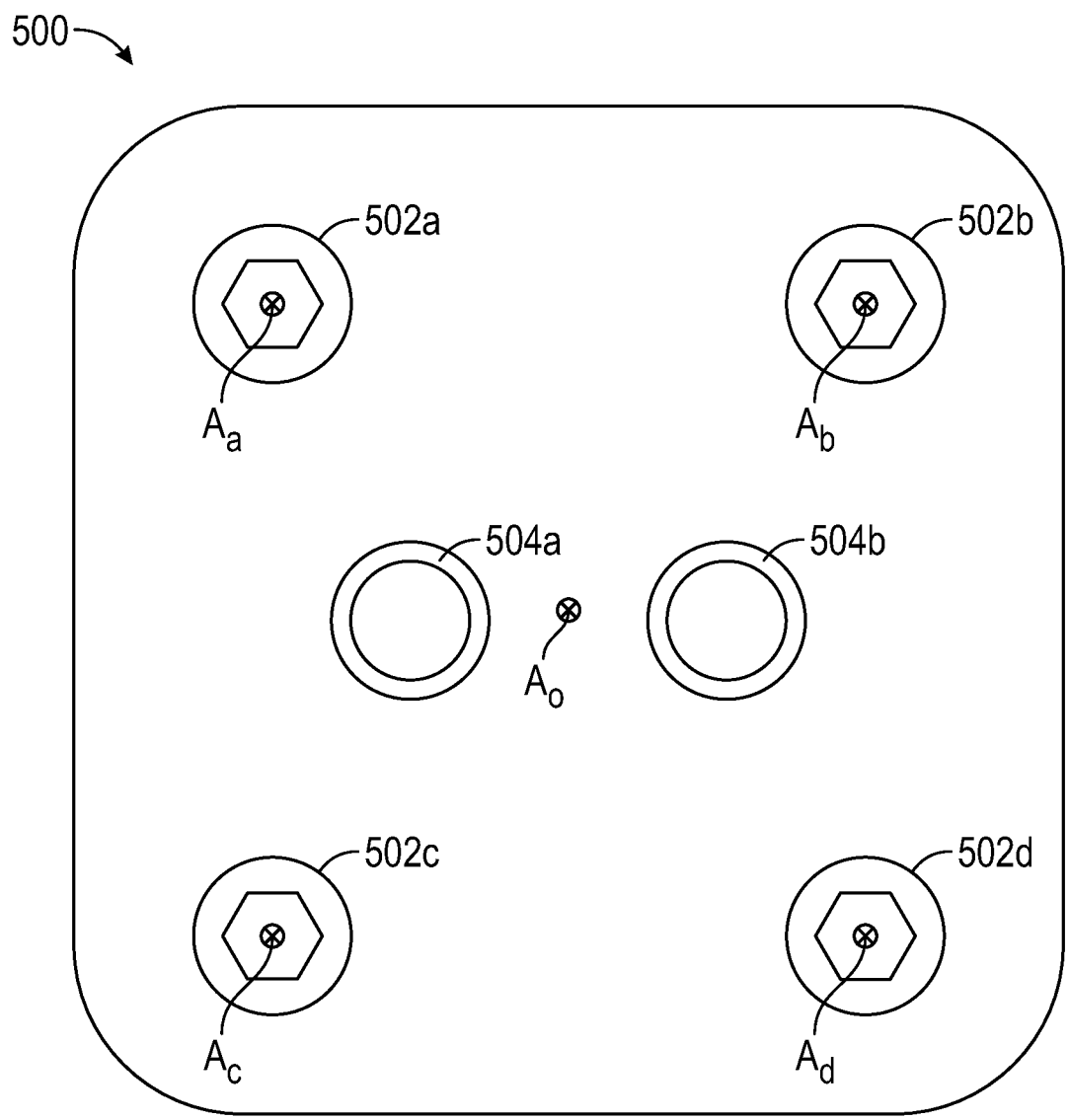
FIG. 5 is a top down plan view of a captive fastener system in accordance with an embodiment of the present disclosure.

For example, turning to FIG. 5, a schematic illustration of a captive fastener system 500 in accordance with an embodiment of the present disclosure is shown. In this embodiment, captive fastener system 500 includes four captive fastener assemblies 502a, 502b, 502c, 502d (i.e., at least one additional captive fastener assembly) and two mounting assemblies 504a, 504b (i.e., at least one additional mounting assembly) that are all connected by a joining body 506.

FIG. 5 is also illustrative of the degrees of movement or freedom provided by the captive fastener systems of the present disclosure. When the mounting assemblies 504a, 504b are not fully and tightly fastened/secured to a first structure, the joining body 506 is movable about a primary axis $A_O$ (e.g., left-right, up-down on the page of FIG. 5). Once the captive fastener assemblies 502a, 502b, 502c, 502d are substantially aligned over respective threaded holes of a second structure, the mounting assemblies 504a, 504b may be secured to the first structure to fix the relative positions of the captive fastener assemblies 502a, 502b, 502c, 502d. Then, each of the fasteners of the respective captive fastener assemblies 502a, 502b, 502c, 502d may be moved relative to or about a respective captive fastener axis $A_a$, $A_b$, $A_c$, $A_d$ to enable proper threading of the fasteners into the second structure and secure and attach the first structure to the second structure. It is noted that the joining body 506 not only fixedly aligns/relates each of the captive fastener assemblies 502a, 502b, 502c, 502d but also can provide for an engagement surface to contact the first structure and apply a force thereto when the captive fasteners are threadedly connected to the second structure.

Although the above illustrated embodiments depict specific geometries, number of parts, and relationships between components, such illustrative embodiments are not intended to be limiting. It will be appreciated by those of skill in the art that the various components of the present disclosure can have different shapes, geometries, sizes, orientations, and positional relationships, without departing from the scope of the present disclosure.

Figure 6A:
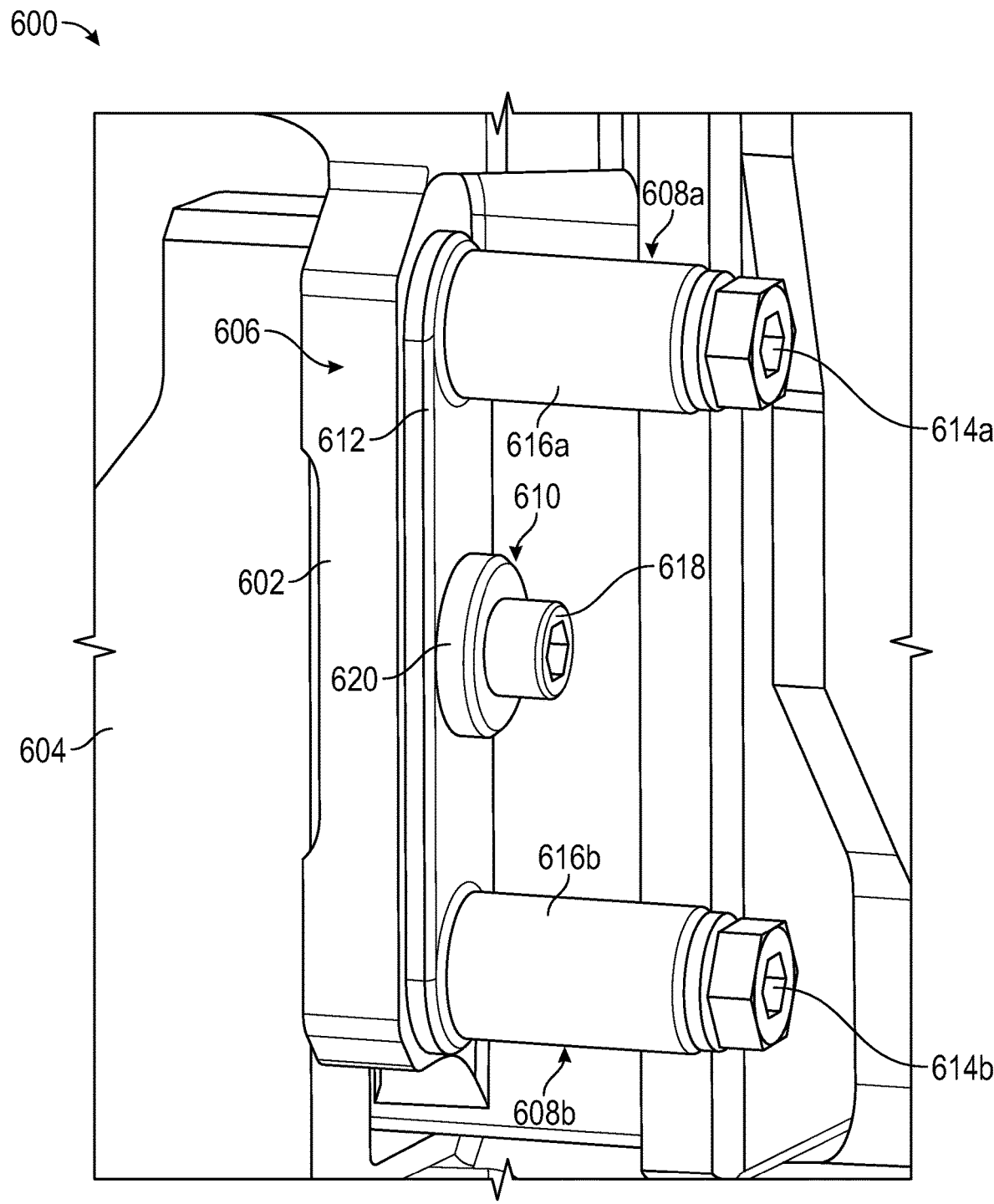
FIG. 6A is a schematic illustration of an assembly of joined structures using a captive fastener system in accordance with an embodiment of the present disclosure.
Figure 6B:
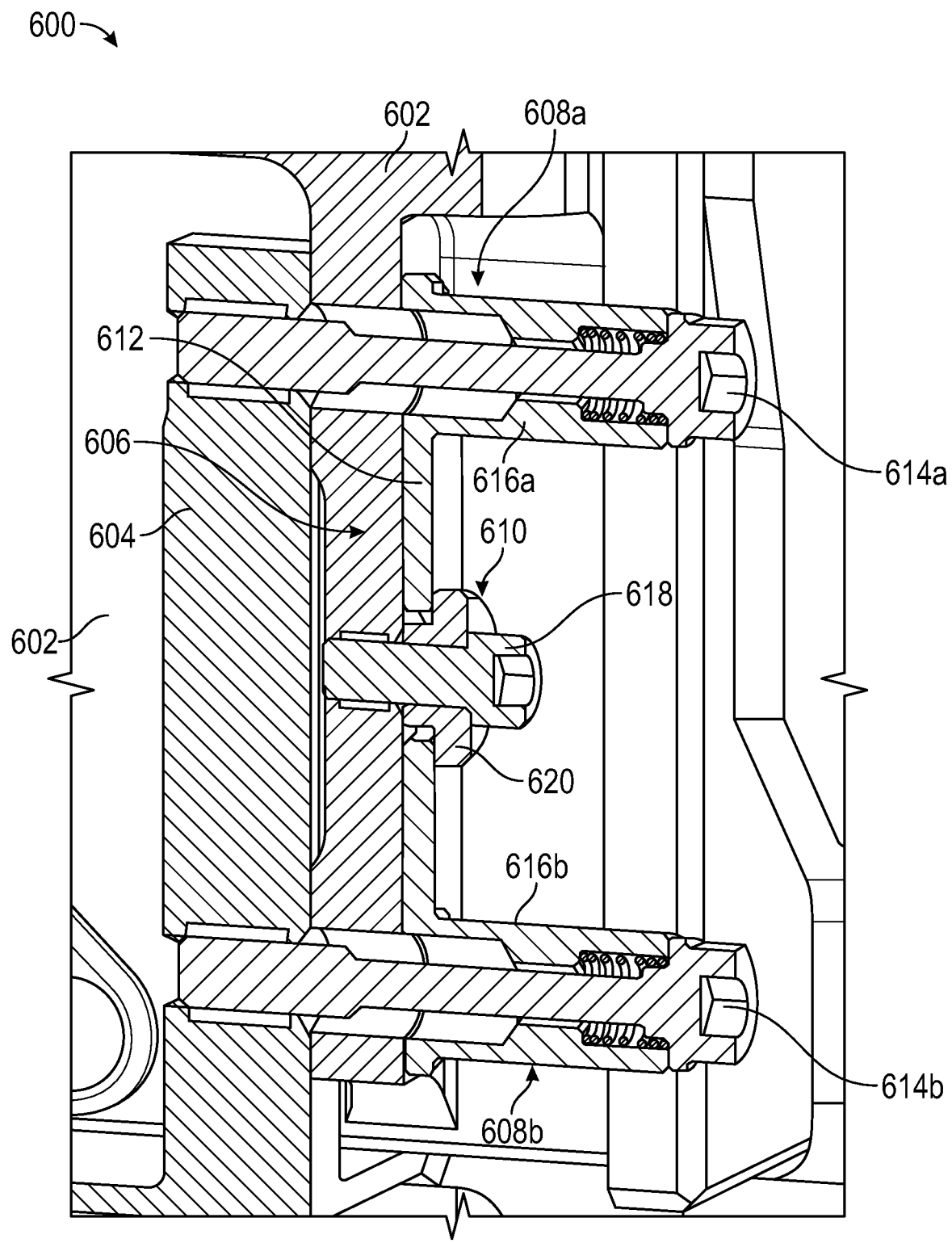
FIG. 6B is a schematic cross-section illustration of the assembly of FIG. 6A.

Turning now to FIGS. 6A-6B, schematic illustrations of a structural assembly 600 that has a first structure 602 connected to a second structure 604 by a captive fastener system 606 in accordance with an embodiment of the present disclosure are shown. FIG. 6B is a cross-sectional view of the view of FIG. 6A. The captive fastener system 606 includes two captive fastener assemblies 608a, 608b (i.e., at least one additional captive fastener assembly), a mounting assembly 610, and a joining body 612 that connects the captive fastener assemblies 608a, 608b and the mounting assembly 610. Each captive fastener assembly 608a, 608b includes a respective captive fastener 614a, 614b installed through a respective sleeve 616a, 616b. The captive fastener assemblies 608a, 608b are configured to threadedly engage with the second structure 604 and the mounting assembly 610 is configured to threadedly engage with the first structure 602.

The mounting assembly 610 includes a mounting fastener 618 and a bushing 620. When installing and mounting the first structure 602 to the second structure 604, the captive fastener system 606 may be positioned such that the mounting fastener 618 of the captive fastener system 606 is aligned with a threaded hole of the first structure 602. The mounting fastener 618 may be engaged slightly but allow for the entire captive fastener system 606 to move, and specifically, the joining body 612 may be adjusted to have the captive fasteners 614a, 614b to be substantially aligned with respective threaded holes of the second structure 604. The mounting fastener 618 may then be fully fastened and force the bushing 620 into contact with the joining body 612 and to secure the joining body 612 and the connected fastener assemblies 608a, 608b to the first structure 602. In other configurations, as described below, even when fully fastening the mounting fastener 618, the joining body 612 may be moveable relative to the mounting fastener 618 and bushing 620. After engaging the mounting fastener 618, the captive fasteners 614a, 614b may be threadedly engaged with threaded holes of the second structure 604 and thus secure the first structure 602 to the second structure 604.

Figure 7:
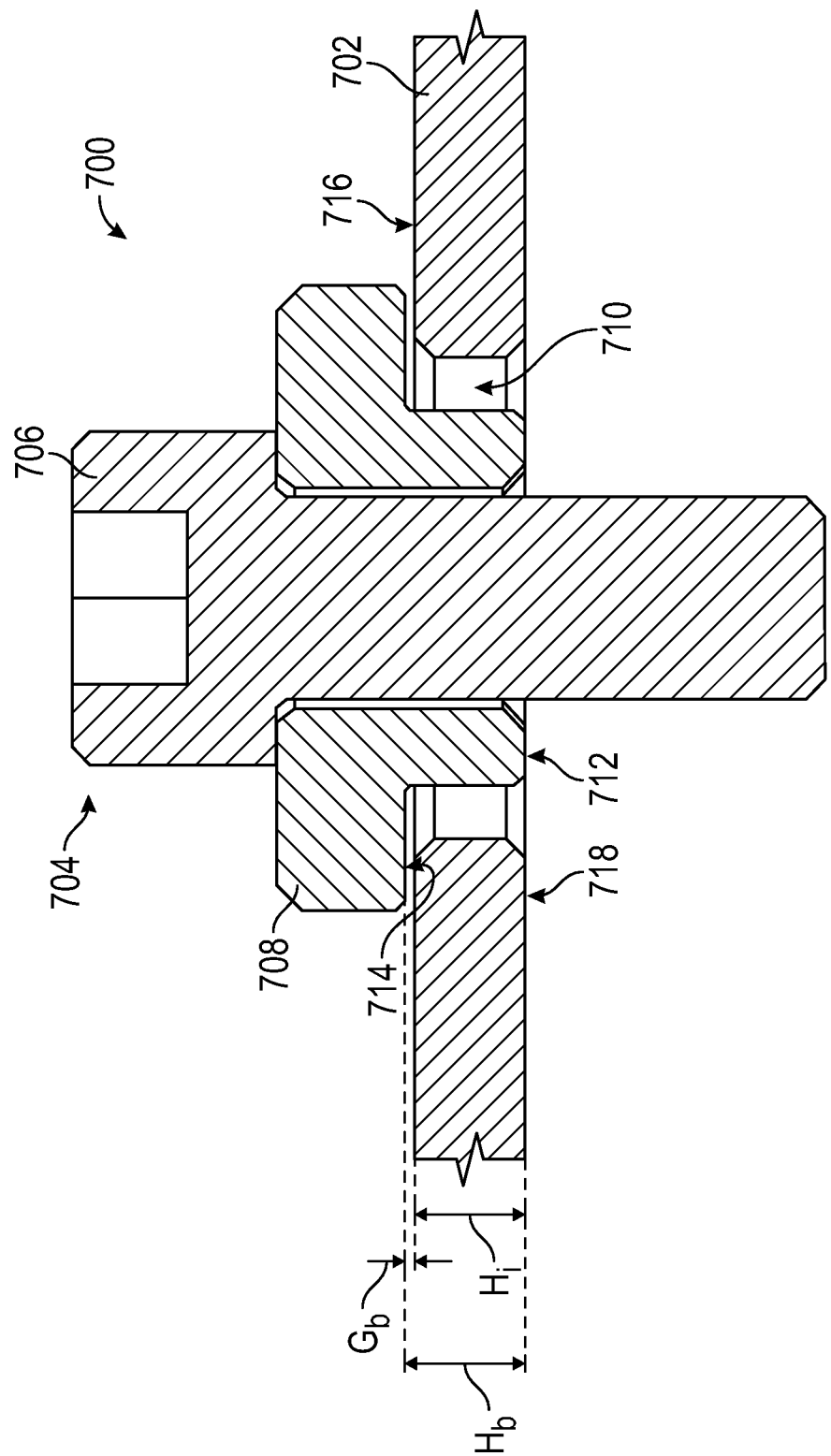
FIG. 7 is a schematic illustration of an aspect of a captive fastener system in accordance with an embodiment of the present disclosure.

Turning now to FIG. 7, a schematic illustration of a portion of a captive fastener system 700 in accordance with an embodiment of the present disclosure is shown. The captive fastener system 700 includes captive fastener assemblies (not shown) that are attached to a joining body 702. The captive fastener system 700 includes a mounting assembly 704 that includes a mounting fastener 706 and a bushing 708. The bushing 708 is arranged to movably sit within a mounting aperture 710 of the joining body 702.

The mounting fastener 706 is configured to threadedly engage with a first structure and, when fully tightened, to secure the bushing 708 and moveably secure the joining body 702 relative to the first structure. After fully tightening the mounting fastener 706, the joining body 702 has play or movement within the mounting aperture 710 between the joining body 702 and the bushing 708, which adds additional freedom of adjustment of the captive fastener system 700. For example, when the mounting fastener 706 is fully tightened, a contact surface 712 of the bushing 708 will contact a surface of the first structure to which the mounting fastener 706 engages. The joining body 702 is free to move about the bushing 708.

To enable the freedom of movement of the joining body 702, the dimensions of the bushing 708 and the joining body 702 are appropriately set. For example, as shown in FIG. 7, the bushing 708 includes a captive surface 714 that is configured to be arranged relative to a retention surface 716 of the joining body 702 and prevent the joining body 702 from moving in an axial direction relative to the mounting fastener 706 by more than a limited amount. When installed to a first structure, the joining body 702 has a respective contact surface 718 that contacts the first structure. As such, when installed, the contact surface 712 of the bushing 706 and the contact surface 718 of the joining body 702 will contact the first structure.

However, the mounting fastener 706 and bushing 708 are not configured to fixedly secure the joining body 702 in place, but rather a limited amount of movement of the joining body 702 is provided. The bushing 708 has a bushing height $H_b$ that is defined between the contact surface 712 of the bushing 708 and the captive surface 714 of the bushing. The joining body 702 has a body thickness $H_j$ that is defined as the material thickness between the contact surface 718 of the joining body 702 and the retention surface 716 of the joining body 702. To allow for the relative movement of the joining body 702 after tightening of the mounting fastener 706, a bushing gap $G_b$ is formed between the contact surface 714 of the bushing 708 and the retention surface 716 of the joining body 702. It will be appreciated that the bushing gap $G_b$ may be implemented with any of the above described captive fastener systems of the present disclosure and variations thereof.

Advantageously, embodiments of the present disclosure are directed to increased float captive fastener systems. The captive fastener systems of the present disclosure are not part of either structure of two joined structures, which enables an additional degree of movement or freedom for adjusting parts relative to each other. The captive fastener systems maintain the existing radial float between the captive fastener and the sleeve but adds an additional degree of float by allowing the sleeve to float relative to a structure as well. This additional float is not dependent on the captive fastener size and can be tailored to specific applications and configurations. A first degree of float is provided between a reduced shank of a captive fastener and the inner diameter/surface of the internal thread in the sleeve. A second degree of float is provided at the mounting assembly with the bushing that engages with the joining body which includes the sleeve(s) of the captive fastener assemblies and allows for additional float by providing a clearance between the bushing outside diameter and the inside diameter of the hole in the joining body. Advantageously, embodiments of the present disclosure provide for captive fasteners that can float relative to both structures to which the captive fasteners attach and join.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A captive fastener system comprising:
a captive fastener assembly having a sleeve and a captive fastener arranged within the sleeve, wherein the sleeve includes an internal thread configured to enable the captive fastener to be secured within the sleeve by the internal thread, wherein the captive fastener comprises a head at one end, a threaded portion at an opposite end, and a reduced diameter shank extending between the head and the threaded portion, wherein the threaded portion is configured to engage with and to threadedly pass through the internal thread to floatingly retain the captive fastener within the sleeve, and wherein the reduced diameter shank has a diameter that is less than an internal surface of the internal thread to provide a float between the shank and the internal thread;
a mounting assembly having a bushing and a mounting fastener arranged to pass through the bushing; and
a joining body having a mounting aperture, wherein the sleeve is attached to the joining body and the bushing and the mounting fastener are configured to pass through the mounting aperture, and the sleeve is integrally formed with the joining body and extends therefrom, wherein the sleeve and the joining body form a single, continuous structure formed of a continuous material,
wherein the mounting assembly provides a first degree of movement of the captive fastener system, the first degree of movement provided by a bushing gap defined between a contact surface of the bushing and a retention surface of the joining body and the bushing is arranged to movably sit within the mounting aperture of the joining body, and
wherein the captive fastener assembly provides a second degree of movement of the captive fastener system by the float between the shank and the internal thread.

2. The captive fastener system of claim 1, wherein the captive fastener assembly includes a biasing element configured to provide a biasing force to the captive fastener.

3. The captive fastener system of claim 1, wherein the reduced diameter shank has a diameter that is less than a diameter of the threaded portion.

4. The captive fastener system of claim 1, wherein the mounting fastener is configured to threadedly connect to a first structure and the captive fastener is configured to threadedly connect to a second structure to fixedly attach the first structure to the second structure.

5. The captive fastener system of claim 1, further comprising at least one additional captive fastener assembly having a respective sleeve and a respective captive fastener, wherein the sleeve of the at least one additional captive fastener assembly is attached to the joining body.

6. The captive fastener system of claim 1, further comprising at least one additional mounting assembly having a respective bushing and a respective mounting fastener, wherein the at least one additional mounting assembly is configured to pass through an additional mounting aperture of the joining body.

7. A structural assembly comprising:
a first structure;
a second structure, wherein the first structure is configured to be mounted to the second structure; and
a captive fastener system configured to mount and connect the first structure to the second structure, the captive fastener system comprising:
a captive fastener assembly having a sleeve and a captive fastener arranged within the sleeve, wherein the captive fastener is configured to threadedly engage with the second structure, wherein the sleeve includes an internal thread configured to enable the captive fastener to be secured within the sleeve by the internal thread, wherein the captive fastener comprises a head at one end, a threaded portion at an opposite end, and a reduced diameter shank extending between the head and the threaded portion, wherein the threaded portion is configured to engage with and to threadedly pass through the internal thread to floatingly retain the captive fastener within the sleeve, and wherein the reduced diameter shank has a diameter that is less than an internal surface of the internal thread to provide a float between the shank and the internal thread;

a mounting assembly having a bushing and a mounting fastener arranged to pass through the bushing, wherein the mounting fastener is configured to threadedly engage with the first structure; and a joining body having a mounting aperture, wherein the sleeve is attached to the joining body and the bushing and the mounting fastener are configured to pass through the mounting aperture, and the sleeve is integrally formed with the joining body and extends therefrom, wherein the sleeve and the joining body form a single, continuous structure formed of a continuous material, wherein the mounting assembly provides a first degree of movement of the captive fastener system, the first degree of movement provided by a bushing gap defined between a contact surface of the bushing and a retention surface of the joining body and the bushing is arranged to movably sit within the mounting aperture of the joining body, and wherein the captive fastener assembly provides a second degree of movement of the captive fastener system by the float between the shank and the internal thread.

8. The structural assembly of claim 7, wherein the captive fastener assembly includes a biasing element configured to provide a biasing force to the captive fastener.

9. The structural assembly of claim 7, wherein the reduced diameter shank has a diameter that is less than a diameter of the threaded portion.

10. The structural assembly of claim 7, wherein the joining body defines an engagement surface that contacts and engages with the first structure.

11. The structural assembly of claim 7, further comprising at least one additional captive fastener assembly having a respective sleeve and a respective captive fastener, wherein the sleeve of the at least one additional captive fastener assembly is attached to the joining body.

12. The structural assembly of claim 7, further comprising at least one additional mounting assembly having a respective bushing and a respective mounting fastener, wherein the at least one additional mounting assembly is configured to pass through an additional mounting aperture of the joining body.

* * * * *